UNITED STATES PATENT OFFICE 2,445,468

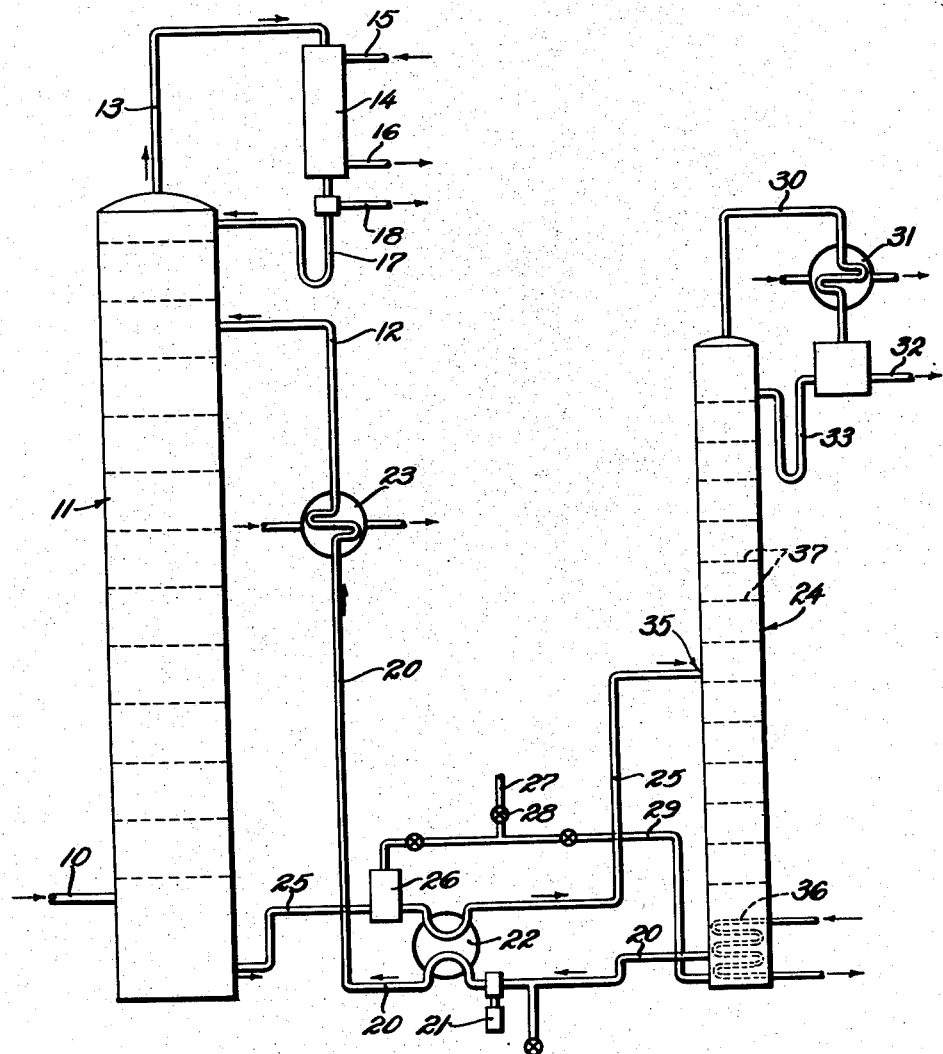

REMOVAL OF ACIDIC CONSTITUENTS FROM GASES

Clyde L. Blohm, Los Angeles, Fred C. Riesenfeld, Hollywood, and Henry D. Frazier, Alhambra, Calif., assignors to The Fluor Corporation, Ltd., Los Angeles, Calif., a corporation of California Application May 19, 1947, Serial No. 749,046

12 Claims. (Cl. 23—2)

This invention relates to the treatment of gaseous mixtures such as natural and refinery gases, for the removal of acidic impurities, including hydrogen sulfide, sulfur dioxide, and carbon dioxide. Particularly the invention is concerned with improvements in the type of process employing an absorbent containing an amine reactive with the acidic impurity in the gas and capable of regeneration by heating, all in a cyclic system as generally understood.

One of the most successful methods employed for the purification of hydrocarbon gases is the so-called combination process as described in Hutchinson Patent No. 2,177,068, issued October 24, 1939, on "Process for treating gases," in which the absorbent comprises a solution containing an amine and glycol or polyhydric alcohol. Among the principal reasons for success of the combination process, is the capacity of the absorbent to effect simultaneous dehydration and acid gas removal, and the absorption efficiency resulting from the completeness with which the solution may be regenerated.

Now it is generally desirable from a number of standpoints that the viscosity of such solutions be low, or substantially lower than the viscosities of the solutions heretofore used. Limitations have been encountered however by reason of the viscosities of the useable glycols and amines, and their required proportions in the solutions. As a result, such factors as heat transfer efficiencies, equipment size and expense, and to a degree the gas-liquid contact efficiencies, have been limited by the solution viscosities.

The general object of the present invention is to provide an improved process employing an amine-containing absorbent having advantages characteristic of an amine-glycol type solution, but having the important physical difference of substantially reduced viscosity, by virtue of which it is possible to obtain more efficient contact of the absorbent with the gas being treated, higher heat transfer rates in both the contactor and heat exchangers, lower regeneration temperatures in the still, and more complete regeneration of the absorbent. These advantages permit substantial overall reduction in plant costs, through the use of a smaller contactor, reboiler, heat exchangers, pumps, and steam requirements.

We have discovered that by using in combination with an amine, or amine mixture, a relatively low viscosity monohydric alcohol instead of a glycol, the viscosities of such solutions can be greatly reduced, and to a degree permitting accomplishment of the named objects. The contemplated amines are those customarily employed for acid gas treatment, and may be classified particularly as the aliphatic amines in which the amine ($NH_2$) radical is attached to the methylene ($CH_2$) group, which in turn may be attached to one or more aliphatic or straight chain groups, saturated or unsaturated, or to a saturated or unsaturated ring, e. g. benzylamine. These amines include the primary, secondary, and tertiary form as well as members of the mono-, di-, triamine series. Of the various aliphatic amines, monoethanolamine, diethanolamine, and triethanolamine, and others of this group are highly satisfactory. At this point it may be mentioned that the invention makes possible the use of amines normally unuseable by reason of their high viscosities, in that the presence of a monohydric alcohol of the character later described, may be used to lower an otherwise excessively high viscosity solution to within practical viscosity limits.

The contemplated preferred alcohols are the monohydric aliphatic alcohols of four or less carbon atoms, which may, however, be substituted in such a manner as to make their boiling temperatures sufficiently high to avoid excessive losses of the alcohol in the absorption and regeneration stages. That is to say, the boiling temperature of the alcohol component will be in excess of the temperature at which the absorbent is regenerated. Typical of suitable alcohols are benzyl alcohol and tetrahydrofurfuryl alcohol. It is contemplated that the percentage of the alcohol in the absorbent will be sufficient to effectively lower the viscosity of the amine or amine-water component, as and for the purposes stated. Ordinarily it will be preferred to use a proportion of alcohol in excess of the percentage of amine in the solution. By reason of the quantity and the low viscosity of the alcohol present, it is now made possible to use in combination plants amines heretofore considered to be unuseable because of their high viscosities, while maintaining a stable solution by virtue of the mutual solubilities of the amine, alcohol and water in the rich as well as lean solutions.

The following are given as typical solutions comprising mixtures of amines with a monohydric alcohol, and having the physical properties indicated. A solution of 60% benzyl alcohol, 35% diethanolamine, and 5% water, has before being contacted with the gas being treated, a viscosity of about 16.8 centistokes at 91° F. The rich solution, i. e. after absorption of acidic impurities from the gas at a mol ratio acid gas to equivalent amine of 0.5 has a viscosity of about 47.0 centistokes. As another example, an absorbent containing 20% monoethanolamine, 77% benzyl alcohol, and 3% water, has a lean solution viscosity at 91° F. of 7.1 centistokes, and a rich solution viscosity of 19.2 centistokes, the acid gas to amine mol ratio, as before being 0.5.

It may be stated that in general, the percentage of monohydric alcohol in the absorbent will be sufficiently high to maintain the rich solution viscosity below 70 centistokes at 91° F., assuming an acid gas to amine mol ratio of 0.5. The solution viscosities, of course, may range well below this limit and far below the viscosities of corresponding or comparable solutions containing glycol in place of the monohydric alcohol.

The invention will be further understood by reference to the accompanying flow sheet illustrative of the absorption and regeneration cycle as employed in actual plant operation. Typically, the absorbent used in the system may be assumed to correspond with either of the examples given.

The gas to be treated is taken through line 10 into the base of the moisture and acid gas absorber 11 which, as will be understood, may be of any suitable type and construction capable of effecting intimate contact between the rising gas stream and the downwardly flowing liquid dehydrating and acid gas removal agent being introduced into the upper interior of the absorber through line 12. The treated gas leaving the absorber through outlet 13 may be passed through condenser 14 through which a cooling medium is circulated via lines 15 and 16 to remove condensible constitutents of the absorbent that may be carried by the outlet gas. Any condensate formed is returned to the absorber through line 17 and the treated gas is taken through line 18 to the gas distributing main.

The treating solution may be supplied to the system from a suitable storage tank 19 and introduced to line 20 within which the absorbent is forced by pump 21 through heat exchanger 22 and cooler 23 to the absorber 11. Heat exchanger 22 is utilized to effect preliminary cooling of the denuded absorbent coming from still 24, by heat transference to the enriched absorbent being circulated from the base of the absorber through line 25 to the still. In cooler 23 the temperature of the absorbent flowing through line 20 is further and finally reduced to increase the absorbing capacity and efficiency of the absorbent mixture in accordance with conditions existing in the absorber. The enriched absorbent taken from the base of the absorber 11 may be passed into a vent tank 26 located in line 25 between the absorber and heat exchanger 22 and maintained at any suitable pressure less than the absorber pressure. Liberation of entrained gases and dissolved gases from the vent tank permits their recovery and reduces materially the vapor load on the still 24. The liberated gases may be released from the vent tank for disposal through line 27 containing a back pressure control valve 28, or the separated gases may be passed through line 29 into the base of the still 24. This latter expedient may be desirable particularly where the acid gas absorbed by the solution is comparatively low, for the purpose of utilizing the partial pressure of the vented vapor and gas to aid in stripping the absorbent in the still and reducing the required temperature of regeneration of the treating solution. However, instead of using these vent gases as stripping aid, and subsequently discharging them to the atmosphere, they may be taken from the vent tank through suitable valves and lines and used for boiler fuel or other desired purposes. As will be understood, the absorbent leaving the vent tank may be pumped or forced by the vent tank pressure through the heat exchanger 22 into the still.

In flowing downwardly through the absorber 11 the liquid absorbs the acid gas and moisture from the natural gas, the percentage of gas or moisture extraction being controllable by regulation of the several variables: temperature, absorbent-to-acid gas ratio and the composition of the absorbent. The enriched absorbent leaving the base of the absorber through line 25 is passed to still 24 wherein it is heated under any desired pressure conditions to a temperature at which regeneration of the solution and removal of the acid gas will occur, and at which the water content of the absorbent is reduced to a predetermined desired point, say 5% by weight of the absorbent. The absorbent, depleted of the acid gas and moisture to the desired extent, then leaves the base of the still through line 20 to be returned to the absorber, and the removed water vapor, reflux and acid gases are discharged through line 30 to a suitable cooler 31. Uncondensed vapors and gases are sent to disposal through line 32.

If, for the purpose of aiding regeneration of the treating solution, or for any other reason, it is desirable to supply additional water to the still as reflux, water condensate may be returned from the final condenser 31 through line 33 and passed downwardly over a sufficient number of plates 37 in the still above the absorbent inlet 35. It is also possible to use steam condensate from the reboiler coils as a source of reflux water. This alternative permits the elimination of the final condenser 31. When used, the water reflux serves the dual purpose of preventing the loss of chemicals and supplying sufficient steam for regeneration. The extent to which the absorbent is dehydrated may be controlled by regulation of the temperature within the base of the still. For this purpose the still may contain a bottom coil 36 supplied with steam to maintain a predetermined maximum temperature to which the absorbent is heated.

By virtue of the presence of the monohydric alcohol in the solution, both hydrogen sulfide and carbon dioxide can be expelled practically completely in the regenerating stage. This is of great importance because the practical absence of hydrogen sulfide in the lean solution returning to the absorber, and the resultant extremely small partial pressure of hydrogen sulfide, permits the production of treated gas containing less than one-tenth of one grain of hydrogen sulfide per 100 standard cubic feet of gas.

We claim:

1. The method of treating a gas for removal of an acidic impurity of the group consisting of hydrogen sulfide, sulfur dioxide and carbon dioxide, that comprises contacting the gas with a solution of an amine, water and a monohydric aliphatic alcohol to form a rich solution containing the absorbed impurity, and heating and regenerating the rich solution for reuse.

2. The method of treating a gas for removal of an acidic impurity of the group consisting of hydrogen sulfide, sulfur dioxide and carbon dioxide, that comprises contacting the gas with a solution of an amine, water and a monohydric aliphatic alcohol having not in excess of four carbon atoms in the aliphatic chain to form a rich solution containing the absorbed impurity, and heating and regenerating the rich solution for reuse.

3. The method of treating a gas for removal of an acidic impurity of the group consisting of hydrogen sulfide, sulfur dioxide and carbon dioxide, that comprises contacting the gas with a solution of an amine, water and a monohydric aliphatic alcohol having a viscosity less than the viscosity of the amine to form a rich solution containing the absorbed impurity, and heating and regenerating the rich solution for reuse.

4. The method of treating a gas for removal of an acidic impurity of the group consisting of hydrogen sulfide, sulfur dioxide and carbon dioxide, that comprises contacting the gas with a solution of an amine, water and a monohydric aliphatic alcohol having not in excess of four carbon atoms in the aliphatic chain and a viscosity less than the viscosity of the amine to form a rich solution containing the absorbed impurity, and heating and regenerating the rich solution for reuse.

5. The method of treating a gas for removal of an acidic impurity of the group consisting of hydrogen sulfide, sulfur dioxide and carbon dioxide, that comprises contacting the gas with a solution of an amine, of the group consisting of monoethanolamine and diethanolamine, water and a monohydric alphatic alcohol having a viscosity less than the viscosity of the amine to form a rich solution containing the absorbed impurity, and heating and regenerating the rich solution for reuse.

6. The method of treating a gas for removal of an acidic impurity of the group consisting of hydrogen sulfide, sulfur dioxide and carbon dioxide, that comprises contacting the gas with a solution of an amine, water and a monohydric aliphatic alcohol to form a rich solution containing the absorbed impurity, and heating and regenerating the rich solution for reuse, the quantity of said alcohol in the solution being in excess of the amine.

7. The method of treating a gas for removal of an acidic impurity of the group consisting of hydrogen sulfide, sulfur dioxide and carbon dioxide, that comprises contacting the gas with a solution of an amine, water and a monohydric aliphatic alcohol having a viscosity less than the viscosity of the amine to form a rich solution containing the absorbed impurity, and heating and regenerating the rich solution for reuse, the quantity of said alcohol in the solution being in excess of the amine.

8. The method of treating a gas for removal of an acidic impurity of the group consisting of hydrogen sulfide, sulfur dioxide and carbon dioxide, that comprises contacting the gas with a solution of an amine, water and a monohydric aliphatic alcohol to form a rich solution containing the absorbed impurity, and heating and regenerating the rich solution for reuse, the viscosity of said rich solution at 91° F. being less than 70 centistokes.

9. The method of treating a gas for removal of an acidic impurity of the group consisting of hydrogen sulfide, sulfur dioxide and carbon dioxide, that comprises contacting the gas with a solution of an amine of the group consisting of monoethanolamine and diethanolamine, wtter and a monohydric aliphatic alcohol having a viscosity less than the viscosity of the amine to form a rich solution containing the absorbed impurity, and heating and regenerating the rich solution for reuse, the viscosity of said rich solution at 91° F. being less than 70 centistokes.

10. The method of treating a gas for removal of an acidic impurity of the group consisting of hydrogen sulfide, sulfur dioxide and carbon dioxide, that comprises contacting the gas with a solution of an amine, water and a monohydric aliphatic alcohol to form a rich solution containing the absorbed impurity, and heating and regenerating the rich solution for reuse, the boiling temperature of said alcohol being greater than the temperature at which the rich solution is regenerated.

11. The method of treating a gas for removal of an acidic impurity of the group consisting of hydrogen sulfide, sulfur dioxide and carbon dioxide, that comprises contacting the gas with a solution of an amine, water and a monohydric aliphatic alcohol of the group consisting of benzyl alcohol and tertahydrofurfuryl alcohol, to form a rich solution containing the absorbed impurity, and heating and regenerating the rich solution for reuse.

12. The method of treating a gas for removal of an acidic impurity of the group consisting of hydrogen sulfide, sulfur dioxide and carbon dioxide, that comprises contacting the gas with a solution of an amine, water and a monohydric aliphatic alcohol of the group consisting of benzyl alcohol and tetrahydrofurfuryl alcohol, to form a rich solution containing the absorbed impurity, and heating and regenerating the rich solution for reuse, the quantity of said alcohol in the solution being in excess of the amine.

CLYDE L. BLOHM.
FRED C. RIESENFELD.
HENRY D. FRAZIER.